United States Patent
Cochran et al.

(10) Patent No.: US 9,862,603 B1
(45) Date of Patent: Jan. 9, 2018

(54) DEVICE FOR QUENCHING REACTION AT VARIABLE TIME POINTS

(71) Applicants: Bio-Cide International, Inc., Norman, OK (US); Cudd Pressure Control, Inc., The Woodlands, TX (US)

(72) Inventors: Mark A. Cochran, Norman, OK (US); Robert Picek, Norman, OK (US); Neeraj Khanna, Norman, OK (US); Enrique M. Proano, Cypress, TX (US); Andrew D. Kramer, The Woodlands, TX (US)

(73) Assignees: Bio-Cide International, Inc., Norman, OK (US); CUDD Pressure Control, Inc., The Woodlands, TX (US)

( * ) Notice: Subject to any disclaimer, the term of this patent is extended or adjusted under 35 U.S.C. 154(b) by 0 days.

(21) Appl. No.: 14/843,795

(22) Filed: Sep. 2, 2015

Related U.S. Application Data

(60) Provisional application No. 62/044,701, filed on Sep. 2, 2014.

(51) Int. Cl.
| | |
|---|---|
| *B01J 19/00* | (2006.01) |
| *B01J 19/24* | (2006.01) |
| *C01B 11/00* | (2006.01) |
| *C01B 11/02* | (2006.01) |

(52) U.S. Cl.
CPC .............. *C01B 11/024* (2013.01); *B01J 19/24* (2013.01); *B01J 2219/24* (2013.01)

(58) Field of Classification Search
CPC ........ B01J 19/00; B01J 19/24; B01J 2219/24; C01B 11/00; C01B 11/02; C01B 11/022–11/024
See application file for complete search history.

(56) References Cited

U.S. PATENT DOCUMENTS

| | | | | |
|---|---|---|---|---|
| 4,534,952 A | * | 8/1985 | Rapson ................. | B01F 3/0865 210/753 |
| 2013/0287722 A1 | * | 10/2013 | Uhlmann ............... | C01B 11/024 424/76.9 |
| 2014/0302176 A1 | * | 10/2014 | Grund .................... | C01B 11/024 424/661 |

FOREIGN PATENT DOCUMENTS

WO    WO 2013/053789 A1 *  4/2013

\* cited by examiner

*Primary Examiner* — Natasha Young
(74) *Attorney, Agent, or Firm* — Hall Estill Law Firm

(57) ABSTRACT

A system and method is provided for producing and delivering a product. The system includes a chamber having an inlet end, an outlet end and quenching points positioned therebetween. The inlet end is configured to receive a plurality of precursors and the quenching points are configured to receive water to obtain quenching of the reaction in the chamber thereby providing varying concentration of the resultant product.

21 Claims, 2 Drawing Sheets

DEVICE FOR QUENCHING REACTION AT VARIABLE TIME POINTS

CROSS-REFERENCE TO RELATED APPLICATIONS

The present application claims priority under 35 U.S.C. §119(e) to U.S. Provisional Application Ser. No. 62/044,701, filed on Sep. 2, 2014, entitled DEVICE FOR QUENCHING REACTION AT VARIABLE TIME POINTS, the entire contents of all which are hereby expressly incorporated herein by reference in their entirety.

BACKGROUND

The use of chlorine dioxide is well established as an antimicrobial compound for various industrial applications. It is widely used for sanitation of food as well as food processing equipment. The common foods that are treated with chlorine dioxide are red meat, poultry, seafood, potatoes, mushrooms, fruits and vegetables. A number of water treatment plants globally use chlorine dioxide for the disinfection of drinking water.

In comparison to other commonly used antimicrobials such as glutaraldehyde, sodium hypochorite, chloramines and quaternary ammonium compounds, chlorine dioxide has a much higher rate of microbial kill. Furthermore, unlike chlorine ($Cl_2$) or hypochlorites ($OCl^-$), chlorine dioxide does not form carcinogenic byproducts such as trihalomethanes. The ultimate breakdown byproduct of chlorine dioxide is innocuous sodium chloride (NaCl). Therefore, $ClO_2$ is generally a primary chemical of choice for applications of environmental concern.

The U.S. Environmental Protection Agency is increasingly expressing its concern towards the use of harmful chemicals used in oilfield production. The agency has made it mandatory to publicly disclose the chemicals used in production of oil and natural gas. Therefore, the use of chlorine dioxide is growing because of its low toxicity profile.

A process which is an the integral part of the oil and gas production is known as hydraulic fracturing. In this process, the well is rigorously stimulated for the purpose of hydrocarbon recovery from the subsurface. It is generally performed in nano-darcy subterranean formations where average permeability is below $1\times10^{-6}$ darcy (darcy is the unit of permeability).

The process involves pumping of a fluid at high pressure and high velocity through a vertical and often a horizontal section of a well. The well is installed with a casing with perforations at targeted intervals of the subterranean formation that holds the hydrocarbon. The pressure exerted during the fracturing process is greater than the pressure required to fracture the formation. During the pumping and after confirmation that fracturing has been initiated, a proppant (such as sand or ceramic beads) is added into the frac water to hold open those fractures to maintain the pathways and prevent subsequent collapse.

Water is the most common fluid that is used for the fracturing process. Water is mixed with friction reducers of desired viscosity to optimize fracturing. This hydraulic mix is prone to microbial growth, which must be inhibited in order to keep the formation free of biological contamination. Many types of bacteria exist in surface water and in the pits, pipes, pumps and tanks used to store and transport that water for the fracturing. If this microbial contamination is not controlled, it can lead to a range of expensive problems for energy companies. These problems include reduced production due to plugging with biofilm or biogenic sulfidic scales, deterioration of the quality of the oil or gas due to the presence of bacteria generated hydrogen sulfide or carbon dioxide, as well as corrosion caused by acid producing or sulfate reducing bacteria.

Use of antimicrobials, also known as biocides, has now become a standard practice in the frac or well treatment water in an effort to minimize contamination by surface bacteria.

Chlorine dioxide is commonly used as a biocide to control the bacteria in the frac water because it is known to be effective against all the types of bacteria of concern to the industry. It breaks down biofilm and polymers where bacteria can hide, and it has a favorable environmental profile. Chlorine dioxide is also used in well treatments because it is effective at neutralizing hydrogen sulfide, breaking down sulfidic scales, and can remove biofilm and polymer residues that can plug the well.

Chlorine dioxide is prohibited from transportation and must be generated on site. At concentrations above 10% in air, chlorine dioxide poses hazards of instantaneous decomposition leading to possible explosion. Therefore it must be produced on site and care must be taken to generate safe concentrations of this gas. It is for this reason that the gas is generated in an aqueous form.

One common method of production of chlorine dioxide is by mixing sodium chlorite and an acid in a predetermined ratio. Often, a third component, sodium hypochlorite, is added as a reactant to improve the yield of chlorine dioxide. The resultant solution has a gaseous content of 50,000-250,0000 ppm which is transferred from generator or storage to the point of injection. Leaks or accidental breakage of the conduits presents risks to an applicator. Therefore these generated solutions are extensively diluted prior to transfer. However, this process only delivers a solution with fixed concentration.

Typical chlorine dioxide generation systems utilize high mixing ratios of activator to sodium chlorite solution to obtain the highest possible conversion to chlorine dioxide. Conversion rates are normally from 80% to 100% depending on whether chlorine is incorporated into the sodium chlorite/acid solution. The chlorine dioxide solution is then injected into the frac or well treatment water.

To this end, although methods of production and delivery of chlorine dioxide of the existing art are operable, further improvements are desirable to enhance the use of a device and method of production of solutions of chlorine dioxide that are safe, effective and convenient to use. It is to such a device, system and method that the present disclosure is directed.

SUMMARY

Various embodiments disclosed herein are generally directed to systems, devices and methods of producing and delivering chlorine dioxide, and more particularly, not by way of limitation, to an improved system, device and method for producing and delivering chlorine dioxide.

In accordance with some embodiments, the present disclosure is directed to a system, device and method for quenching a reaction at variable time points in the system, device and method.

These and other features and advantages which may characterize various embodiments can be understood in view of the following detailed discussion and the accompanying drawings.

DETAILED DESCRIPTION

Figure 1:
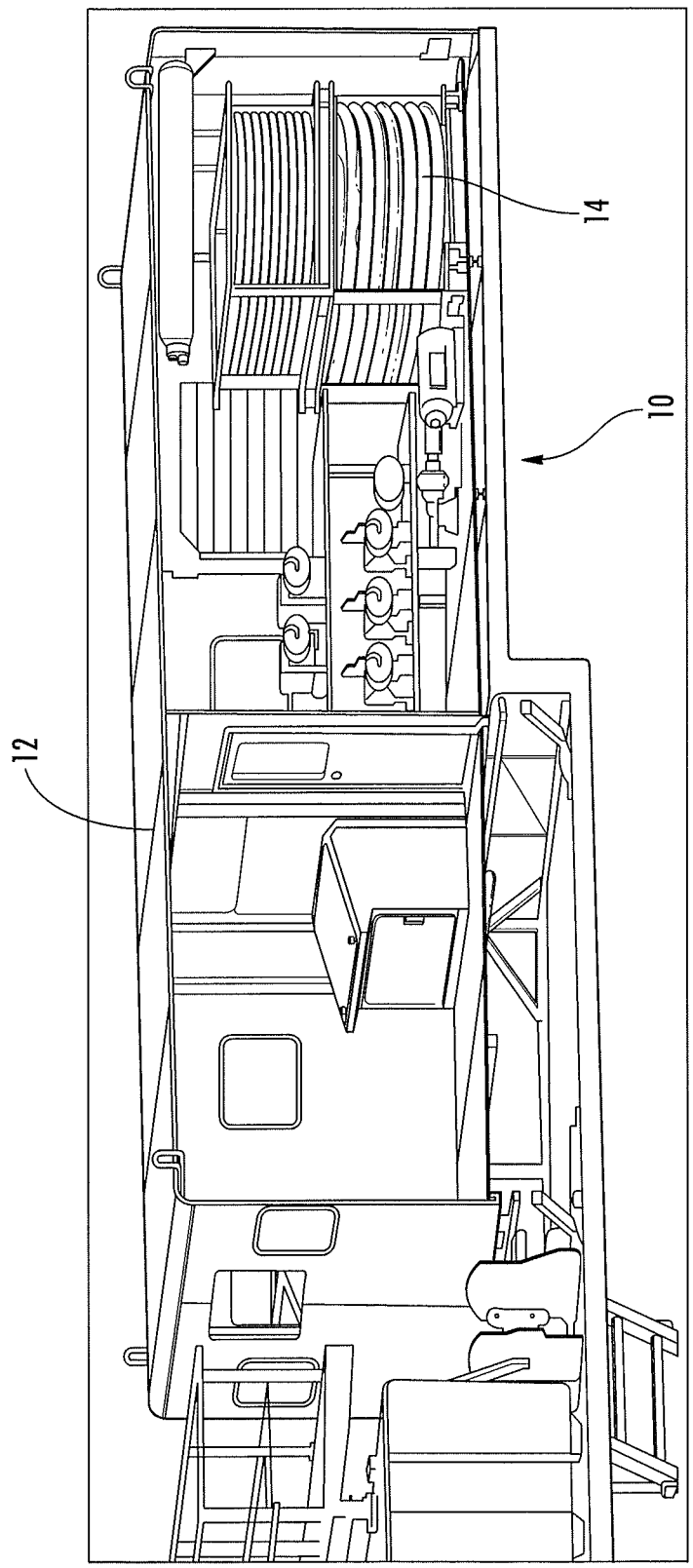
FIG. 1 is a perspective view of an activation system constructed in accordance with the present disclosure, the activation system positioned in a trailer.
Figure 2:
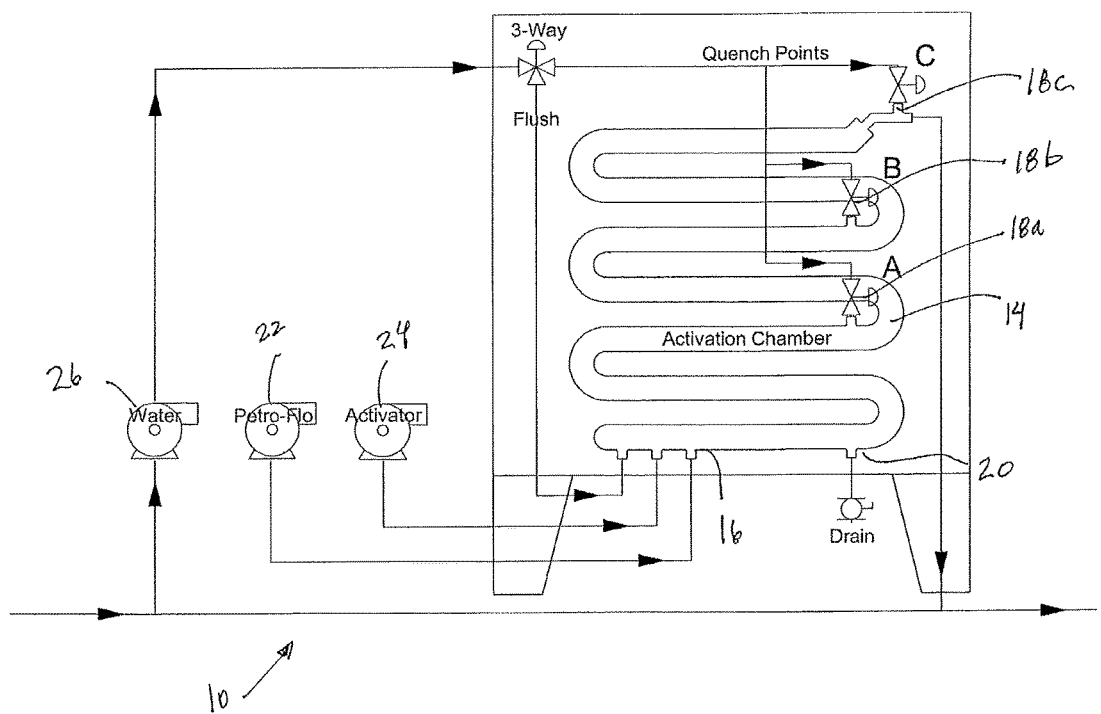
FIG. 2 is a schematic view of the activation system of FIG. 1.

Referring now to the drawings, and more particularly to FIGS. 1-2, an activation system 10 constructed in accordance with one embodiment of the present disclosure is shown positioned in a conventional trailer 12 allowing the activation system 10 to be mobile to various locations requiring chlorine dioxide, such as an oil or gas drilling site, water treatment facility, food processing facility and the like. It should be understood by one of ordinary skill in the art that although shown herein utilized with a conventional trailer 12, the activation system 10 may be adapted to be utilized with a variety of vehicles and/or any other mobile or stationary systems so long as it functions in accordance with the present disclosure. It will be appreciated that trailers are well known in the art. It is not believed necessary to describe the trailer 12 in further detail and is deemed sufficient for purposes of understanding the trailer 12 in accordance with the activation system 10 constructed in accordance with one embodiment of the present disclosure. Thus, no further description of the trailer 12 components, assembly, construction, or operation is believed necessary for one skilled in the art to understand and implement one embodiment of the activation system 10 of the present disclosure.

Broadly, in one embodiment, the activation system 10 includes a chamber 14 having an inlet end 16, a plurality of quenching points 18a, 18b, and 18c and an outlet end 20. The system 10 enables the variable activation chamber 14 with multiple residence times in a single system without the need for individual activation chambers. The chamber 14 is constructed from a conventional pipe, hose or tube, such as, for example, rigid plastic like PVC, a flexible hose or other compatible material with an overall diameter and length that will provide an appropriate amount of chamber 14 capacity to enable proper activation at different flow rates and time points. Further, it will be appreciated that the size and configuration of the chamber 14, and portions thereof, may vary widely dependent upon the size of the pipe/hose and of the type of material being utilized in a manner so that the chamber 14 functions as described herein. For example, in one embodiment, a combination of pipes of different diameters attached in series may be provided. Additionally, in various embodiments, the diameter of the pipe/hose is between 0.25 inches and 6.0 inches.

The inlet end 16 of the chamber 14 may incorporate a variety of fittings to inject a plurality of various fluids, such as, for example, sodium chlorite, acid, and water, as shown as 22, 24 and 26. It should be understood that although discussed herein, the diluents(s) for quenching is aqueous, in some embodiments, the diluent for quenching is a non-aqueous liquid/fluid. In one embodiment, the chlorite solution that is pumped into the chamber 14 can range from between 1% and 30% by weight, in other embodiments between 7% and 25% by weight. In one embodiment, the acid is aqueous. The aqueous acid is a hydrochloric acid present in an amount between 5% and 33% by weight. Additionally, two commercially available products that can be used in these systems are Petro-Flo and OxiFlo®, both of which are currently manufactured by Bio-Cide International, Inc., located in Norman, Okla. In some embodiments, a plurality of precursors may also be introduced to the system, such as various friction reducers, scale inhibitors, chelating agents, surfactants and diverters, all of which are known to one of ordinary skill in the art. The friction reducer is provided in an amount between 0.1 and 2.5 gallons per thousand gallons (GPT). The scale inhibitor is provided in an amount between 0.1 and 3.0 GPT. The chelating agent is provided in an amount between 1% and 20% concentration. The surfactant is provided in an amount between 0.1% to 10% concentration and the diverter is provided in an amount between 1% and 10% concentration. It should understood by one of ordinary skill in the art that any fluid can be utilized in the chamber 14 so long as the fluid functions in accordance with the present disclosure.

The plurality of quenching points 18a, 18b and 18c are positioned at different locations along the length of the chamber 14. Dilution water is injected at the quenching points 18a, 18b and 18c. This dilution water will quench the activation reaction at the time of contact and will stop the reaction from proceeding. The dilution water with the activated chlorine dioxide solution then flows to the outlet end 20 of the chamber 14. It should be understood that the system 10 may use any number of valves and water injection points in a chamber 14 to allow an applicator several options to quench the reaction such that a single chamber 14 or dilution unit can be used for varying water flows by maintaining a concentration of active ingredient in the use-solution. The multiple valves can also be combined into a single multi-way valve assembly such as a three-way valve.

The outlet end 20 incorporates fittings to deliver the activated solution containing a resultant product, such as, in one embodiment, chlorine dioxide and other oxychloro intermediates.

In use, in one embodiment, the one (1) million gallons of water from a fracking job was introduced to the system. The water used from a pit initially had a heavy microbial contamination. The microbial analysis of the water demonstrated a 3-log count of sulfate reducing bacteria, 2-log count of acid producing bacteria and a 2-log count of general aerobic bacteria. The parameters of the frac are described in Example 1, below. After three days, the flow back water from the well showed zero microbial count.

The present disclosure relates to a method of production of solutions of chlorine dioxide that are safe, effective and convenient to use. In this process, the reaction equilibrium is only partially pushed to the product side to form chlorine dioxide. This process allows residual benefits. Chlorine dioxide is a free radical which is very reactive and may be consumed by materials such as planktonic bacteria or biofilm. In water systems chlorine dioxide reacts with some metal ions such as iron and manganese. It won't normally exist long enough to deeply penetrate the well formation unless it is used at very high doses.

Another advantage of this system is that the reaction equilibrium is controlled without impacting a change in the pH of the reaction. Generally, in a reaction of this nature, if a higher concentration of chlorine dioxide is desired, more acid is added to the reaction mixture that lowers the pH of the system. In the present disclosure, the reaction time is used as the parameter to control the product quantity.

In the system described here, the rate and amount of conversion of sodium chlorite to chlorine dioxide can be optimally controlled in such a way that the activated solution will contain not only short-lived chlorine dioxide, but the other longer lasting oxychloro compounds which include the unreacted chlorite ion. This could be achieved by accurately controlling the injection rates of the precursors coupled with the control of residence time the two reactions are mixed together in concentrated form prior to dilution. This forms a resultant solution of mixed oxidants. While the oxychloro species have a relatively slower rate of kill for bacteria as compared to chlorine dioxide, they can remain active longer (from hours to days).

A well system will be better protected against subsequent bacterial and biofilm infection if the biocide used provides a level of residual efficacy for the first hours to days following treatment. This is the time when any bacteria that may have survived the initial kill may redevelop a biofilm colony. It is generally observed that when a level of the oxychloro residual is maintained in the frac or treatment water for the first few days after treatment, it will prevent these bacteria from forming a biofilm colony within the treated system.

The flow rate of frac or treatment water can change from one well to the other (in the range of 1 to 120 barrels per minute), and the chlorine dioxide/oxychloro dosage may change from a range of 5 ppm to as high as 5000 ppm. The amount of time the two precursors are allowed to be mixed is the third variable in the process. Each of these different parameters is evaluated and calculated with relation to the other to determine the correct size reservoir that will be needed to obtain the desired concentration of chlorine dioxide and oxychloro species in the resultant solution. The size of the activation chamber required can have a wide range (from 1 gallon to sometimes more than 100 gallons).

While one embodiment of the present disclosure is described herein utilized in an oil and gas application, it should be understood by one of ordinary skill in the art, the apparatus and methods of the present disclosure may be readily applied to use in other applications, such as in water treatment, food processing, sanitation of hard surfaces in food processing facilities and hospitals, drinking water treatment, cooling water treatment, irrigation water for the horticulture industry, treatment of direct food such as meat or potatoes, and with other systems and other suitable devices. It should be understood that changes may be made in the operation and the setup of at least one embodiment of the present disclosure accordingly.

In order to further illustrate the present invention, the following examples are given. However, it is to be understood that the examples are for illustrative purposes and are not to be construed as limiting the scope of the subject invention.

EXAMPLES

Example 1

In this example a 80 foot high-density polyethylene pipe is rolled up in a loop with water injection points at 18.38 ft. The schematic is shown in FIG. 1. The resultant solution was pumped into the water stream used for hydraulic fracturing. The data for this system is summarized below.

| Parameter | Data |
| --- | --- |
| 1. Site location | West Texas |
| 2. Output volume | 100 bpm |
| 3. Conduit diameter | 2 inch |
| 4. Water injection point | 68 ft |
| 4. Precursor injection rate | 1.36 gpm |

| Parameter | Data |
| --- | --- |
| 5. Activator injection rate | 0.26 gpm |
| 6. Residence time | 8 minutes |
| 7. Percentage activation | 33% |
| 8. Total Available $ClO_2$ dosage | 15 ppm |
| 9. Free $ClO_2$ measured (avg. of n = 9) | 4.8 ppm | bmp = barrels per minute where a barrel is 42 gall

Example 2

The unit of Example 1 where the desired output volume was 50 bpm, the water injection point was changed to 34 feet to achieve the solution properties similar to that obtained in Example 1. The data is summarized in the table below.

| Parameter | Data |
| --- | --- |
| 1. Site location | MidCon |
| 2. Output volume | 50 bpm |
| 3. Conduit diameter | 2 inch |
| 4. Water injection point | 34 ft |
| 4. Precursor injection rate | 0.63 gpm |
| 5. Activator injection rate | 0.07 gpm |
| 6. Residence time | 8 minutes |
| 7. Percentage activation | 33% |
| 8. Total Available $ClO_2$ dosage | 15 ppm |
| 9. Free $ClO_2$ measured (avg. of n = 4) | 5.2 ppm |

Example 3

The unit of Example 1 where the desired output volume was 80 bpm, the water injection point was changed to 92 feet to achieve the solution properties different from that of Example 1 and Example 2. In this Example the desired concentration of total available chlorine dioxide and free chlorine dioxide was 25 ppm and 8 ppm, respectively.

| Parameter | Data |
| --- | --- |
| 1. Site location | MidCon |
| 2. Output volume | 80 bpm |
| 3. Conduit diameter | 2 inch |
| 4. Water injection point | 92 ft |
| 4. Precursor injection rate | 1.68 gpm |
| 5. Activator injection rate | 0.19 gpm |
| 6. Residence time | 8 minutes |
| 7. Percentage activation | 33% |
| 8. Total Available $ClO_2$ dosage | 25 ppm |
| 9. Free $ClO_2$ measured (avg. of n = 3) | 7.9 ppm |

Example 4

In this unit the diameter of the unit was 3 inches versus 1 inch used in Example 1-3. This unit was used for well remediation where output volumes are relatively much lower than those used in fracturing. The concentration of the resultant solutions was two orders of magnitude greater than that used in fracturing operations. The desired output volume was 80 bpm. The water injection point was 167 ft to achieve the solution properties suited for well remediation. The concentration of total available chlorine dioxide and free chlorine dioxide was also much greater in this example. The data for this Example is recorded in the table below.

| Parameter | Data |
| --- | --- |
| 1. Site location | West Texas |
| 2. Output volume | 4 bpm |
| 3. Conduit diameter | 3 inch |
| 4. Water injection point | 167 ft |
| 4. Precursor injection rate | 10.08 gpm |
| 5. Activator injection rate | 3.32 gpm |
| 6. Residence time | 4.6 minutes |
| 7. Percentage activation | 90% |
| 8. Total Available ClO$_2$ dosage | 3000 ppm |
| 9. Free ClO$_2$ measured (n = 1) | 2786 ppm |

Example 5

Multiple S-shaped PVC pipes were combined together to obtain a device shown as FIG. 2. The diameter of the pipe is 3 inches. The unit has three injection points namely A, B and C at 132 inches, 228 inches, and 324 inches, respectively, from the injection point for the two precursors.

The entire unit is housed in a stainless steel enclosure with dimensions of 60" (L)×48" (W)×18" (D).

Injection points are 1" Stainless Cam fittings.

This unit delivers a 3000 ppm solution of total available chlorine dioxide at Petro-Flo injection rate of 1.05 GPM and 7.5% hydrochloric acid pumping rate of 0.21 GPM. It takes dilution water at a rate between 12 to 18 GPM. At 17.5 GPM of Dilution Water the three quench points namely A, B and C will provide the following activation times.

| Quench point | Volume of chamber | Residence time | Percent activation |
| --- | --- | --- | --- |
| A | 4 gallons | 3.17 minutes | 20 |
| B | 7 gallons | 5.56 minutes | 28 |
| C | 10 gallons | 7.94 minutes | 30 |

From the above description, it is clear that the present disclosure is well-adapted to carry out the objects and to attain the advantages mentioned herein, as well as those inherent in the invention. While presently preferred embodiments of the invention have been described for purposes of this disclosure, it will be understood that numerous changes may be made which will readily suggest themselves to those skilled in the art and which are accomplished within the spirit of the invention disclosed and claimed herein.

What is claimed is:

1. A system for producing a resultant product, comprising: a chamber having an inlet end, an outlet end and a plurality of quenching points positioned therebetween, wherein the inlet end is configured to receive a plurality of precursors such that the plurality of precursors enter the chamber at the inlet end and the plurality of quenching points are configured to receive water such that water enters the chamber at the quenching points to obtain quenching of the reaction in the chamber thereby providing varying concentration of the resultant product.

2. The system of claim 1 wherein the resultant product is comprised of chlorine dioxide and other oxychloro intermediates.

3. The system of claim 1 wherein the plurality of precursors are sodium chlorite and an aqueous acid.

4. The system of claim 3 wherein the sodium chlorite is present in an amount of between 7% and 25% by weight.

5. The system of claim 3 wherein the aqueous acid is a hydrochloric acid present in an amount between 5% and 33% by weight.

6. The system of claim 1 wherein a friction reducer is provided with the plurality of precursors.

7. The system of claim 1 wherein a scale inhibitor is provided with the plurality of precursors.

8. The system of claim 1 wherein the chamber is a combination of pipes of different diameters attached in series.

9. The system of claim 1 wherein the chamber is mounted on a mobile unit.

10. A method for producing chlorine dioxide: injecting a plurality of precursors into a chamber having an inlet end, an outlet end and quenching points positioned therebetween, wherein the inlet end is configured to receive the plurality of precursors such that the plurality of precursors enter the chamber at the inlet end and the plurality of quenching points are configured to receive water such that water enters the chamber at the quenching points; injecting water into the quenching points of the chamber to obtain quenching of the reaction; and providing chlorine dioxide from the outlet end of the chamber.

11. The method of claim 10 wherein the plurality of precursors are sodium chlorite and an aqueous acid.

12. The method of claim 11 wherein the sodium chlorite is present in an amount of between 7% and 25% by weight.

13. The method of claim 11 wherein the aqueous acid is a hydrochloric acid present in an amount between 5% and 33% by weight.

14. The method of claim 10 wherein a friction reducer is provided with the plurality of precursors.

15. The method of claim 10 wherein a scale inhibitor is provided with the plurality of precursors.

16. The method of claim 10 wherein the chamber is a combination of pipes of different diameters attached in series.

17. The method of claim 10 wherein a chelating agent between 1% and 20% concentration is provided with the plurality of precursors.

18. The method of claim 10 wherein a surfactant between 0.1% and 10% concentration is provided with the plurality of precursors.

19. The method of claim 10 wherein a diverter between 1% and 10% concentration is provided with the plurality of precursors.

20. The method of claim 10 wherein a diluent for quenching is a non-aqueous liquid.

21. The method of claim 10 wherein the equipment is mounted on a mobile unit.

* * * * *